(12) United States Patent
Akinci

(10) Patent No.: US 11,570,578 B2
(45) Date of Patent: Jan. 31, 2023

(54) LOCATION ANALYTICS TECHNIQUES

(71) Applicant: abl solutions GmbH, Nuremberg (DE)

(72) Inventor: Benjamin Akinci, Nuremberg (DE)

(73) Assignee: abl solutions GmbH, Nuremberg (DE)

( * ) Notice: Subject to any disclaimer, the term of this patent is extended or adjusted under 35 U.S.C. 154(b) by 0 days.

(21) Appl. No.: 16/771,532

(22) PCT Filed: Dec. 14, 2017

(86) PCT No.: PCT/EP2017/082750
§ 371 (c)(1),
(2) Date: Jun. 10, 2020

(87) PCT Pub. No.: WO2019/114962
PCT Pub. Date: Jun. 20, 2019

(65) Prior Publication Data
US 2020/0389762 A1    Dec. 10, 2020

(51) Int. Cl.
*H04W 4/029* (2018.01)
*H04W 4/021* (2018.01)
*H04W 4/02* (2018.01)

(52) U.S. Cl.
CPC .......... *H04W 4/029* (2018.02); *H04W 4/021* (2013.01); *H04W 4/023* (2013.01)

(58) Field of Classification Search
CPC ........ H04W 4/021; H04W 4/33; H04W 4/38; H05B 47/115; H05B 47/16; F24F 11/64;
(Continued)

(56) References Cited

U.S. PATENT DOCUMENTS 11,178,509 B2 * 11/2021 Wang ................... H04W 4/38
2009/0103503 A1 * 4/2009 Chhabra ............... H04W 4/029
370/338

(Continued)

FOREIGN PATENT DOCUMENTS

WO    016106287 A1    6/2016

OTHER PUBLICATIONS

Prateek Singh, "Get-MACVendor using Powershell", https://geekeefy.wordpress.com/2017/07/06/get-mac-vendor-using-powershell, Jul. 6, 2017, geekeefy.wordpress.com, p. 2 (Year: 2017).*
(Continued)

*Primary Examiner* — Asghar H Bilgrami
(74) *Attorney, Agent, or Firm* — Rossi, Kimms & McDowell LLP

(57) ABSTRACT

The present disclosure relates to a system (100) comprising a location analytics server (108) and one or more wireless sensing devices (104) installed at a location (102) to be observed. Each of the one or more wireless sensing devices (104) is configured to transmit information about detected wireless devices (112) to the location analytics server (108) and the location analytics server (108) is configured to analyze the information about the detected wireless devices (112) to classify, for each of the detected wireless devices (112), whether the respective wireless device (112) is a visitor device or a passerby device, wherein classifying the respective wireless device (112) is performed based on a location-specific configuration comprising at least one criterion to be satisfied for classifying the respective wireless device (112) as a visitor device, wherein the at least one criterion is specifically adapted to the location (102).

14 Claims, 4 Drawing Sheets

(58) Field of Classification Search
CPC .............. F24F 2120/10; F24F 2120/12; F24F 2130/00; G05B 15/02; G05B 2219/2614; G05B 2219/2642; Y02B 20/40
See application file for complete search history.

(56) References Cited

U.S. PATENT DOCUMENTS

| | | | |
|---|---|---|---|
| 2014/0277763 A1 | 9/2014 | Ramachandran | |
| 2014/0355592 A1* | 12/2014 | Camps | H04W 24/08 370/338 |
| 2015/0358423 A1 | 12/2015 | L'Heureux | |
| 2016/0149716 A1* | 5/2016 | Raj | H04L 12/2827 700/275 |
| 2016/0171486 A1* | 6/2016 | Wagner | G06Q 30/0601 705/39 |
| 2017/0206421 A1* | 7/2017 | Pandey | G06V 20/53 |
| 2018/0004178 A1* | 1/2018 | Haines | G05B 15/02 |
| 2018/0352384 A1* | 12/2018 | Rehman | G01S 5/0252 |
| 2019/0361694 A1* | 11/2019 | Gordon | G06F 1/1626 |
| 2020/0162890 A1* | 5/2020 | Spencer | G06F 16/955 |

OTHER PUBLICATIONS

Vamsi Talia et al. "LoRa Backscatter: Enabling The Vision of Ubiquitous Connectivity", May 16, 2017, Proceedings of the ACM on Interactive, Mobile, Wearable and Ubiquitous Technologies, vol. 1. No. 3, Article 105, Sep. 2017, (Year: 2017).*
International Search Report issued in Intl. Appln. No. PCT/EP2017/082750 dated Jul. 19, 2018.
Written Opinion issued in Intl. Appln. No. PCT/EP2017/082750 dated Jul. 19, 2018.
International Preliminary Report on Patentability issued in Intl. Appln. No. PCT/EP2017/082750 dated Jan. 31, 2020.
Examination Report issued in European Appln. No. 17828869.2 dated Jul. 22, 2021.
Office Action issued in European Appln. No. 17828869.2 dated Sep. 7, 2022.

* cited by examiner

| # detected visitor devices | timestamp | # actual visitors | timestamp |
|---|---|---|---|
| 3 | 12:01:00 | 5 | 12:01:00 |
| 3 | 12:02:00 | 4 | 12:02:00 |
| 3 | 12:03:00 | 5 | 12:03:00 |
| 4 | 12:04:00 | 6 | 12:04:00 |
| 4 | 12:05:00 | 7 | 12:05:00 |
| 4 | 12:06:00 | 6 | 12:06:00 |
| 3 | 12:07:00 | 5 | 12:07:00 |
| 2 | 12:08:00 | 4 | 12:08:00 |
| 3 | 12:09:00 | 5 | 12:09:00 |
| 3 | 12:10:00 | 4 | 12:10:00 |
| average: 3,2 | | average: 5,1 | |
| ==> factor: 1,59 | | | |

Fig. 2

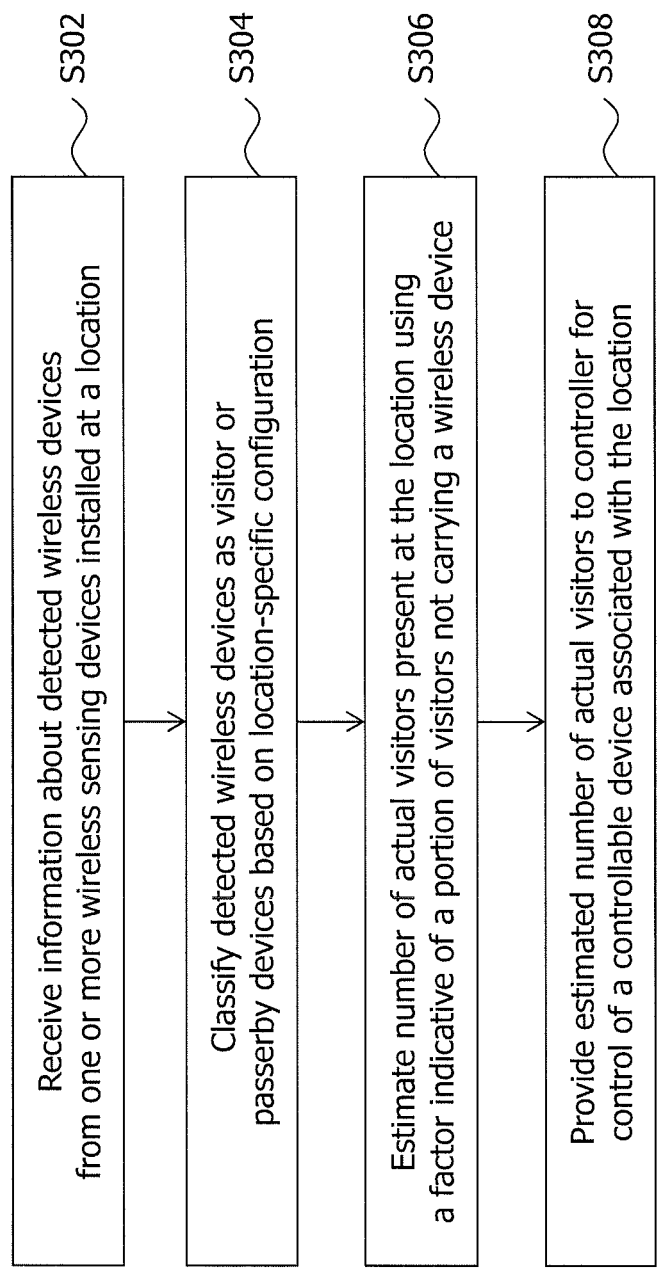

LOCATION ANALYTICS TECHNIQUES

The present disclosure generally relates to the field of location analytics. More particularly, the present disclosure relates to a system comprising a location analytics server and one or more wireless sensing devices installed at a location to be observed, a method performed by a location analytics server, and a location analytics server.

Over the recent decade, the adoption of wireless mobile devices has steadily increased and has today reached a considerable penetration across the worldwide population. For many people, wireless mobile devices, such as smartphones, tablets or mobile music players, have become an integral part of their everyday life and particularly smartphones have established as daily companions that are carried by users at almost any time, no matter where they go.

Wireless mobile devices typically support wireless technologies, such as WiFi and Bluetooth, and it is known to use these technologies as an indicator of user presence at a particular location, such as customer presence at a retail store, for example. In case of WiFi, for example, user presence may be detected based on so called probe requests which, according to the IEEE 802.11 standards, are transmitted at regular intervals from a WiFi enabled wireless device to discover surrounding WiFi access points so that associated wireless networks can be made available to the user. Using the probe requests, a WiFi access point can detect the presence of a wireless device within the range of the WiFi access point irrespective of whether the wireless device is associated with the wireless network or not.

Existing location analytics solutions make use of such techniques in order to collect information about visitors of a location, including the number of visitors present at the location at a particular time or time period, for example. For this purpose, existing solutions typically employ a cloud-based location analytics server which regularly receives information from WiFi access points about detected wireless devices at a particular location and which classifies the detected wireless devices as either belonging to a visitor or to a passerby. If, for example, a wireless device is seen for more than five minutes with a Received Signal Strength Indication (RSSI) of 10 or more, the location analytics server may determine that the wireless device belongs to a visitor. Otherwise, the location analytics server may conclude that the detected wireless device belongs to a passerby.

While such techniques may be sufficient for certain analytics scenarios, they may not produce satisfactory results for other scenarios. It is thus an object of the present disclosure to provide improved location analytics techniques.

According to a first aspect, a system comprising a location analytics server and one or more wireless sensing devices installed at a location to be observed is provided. Each of the one or more wireless sensing devices is configured to transmit information about detected wireless devices to the location analytics server and the location analytics server is configured to analyze the information about the detected wireless devices to classify, for each of the detected wireless devices, whether the respective wireless device is a visitor device or a passerby device. Classifying the respective wireless device is performed based on a location-specific configuration comprising at least one criterion to be satisfied for classifying the respective wireless device as a visitor device, wherein the at least one criterion is specifically adapted to the location.

The system may be a location analytics system in which each of the one or more wireless sensing devices may sense the environment at the location to be observed for the presence of wireless devices and, if one or more wireless devices are detected in the range of a wireless sensing device, information about the detected devices may be transmitted to the location analytics server for further analysis. The presence of wireless devices may be detected based on wireless technologies, such as WiFi and/or Bluetooth, for example, i.e., wireless technologies that are capable to support detection of wireless devices visible in the environment of a wireless sensing device. A wireless sensing device as referred to herein may correspond to a WiFi access point, for example, but is not limited thereto and may generally correspond to any other wireless communication device that is capable of sensing the environment for the presence of other wireless devices, including pairable Bluetooth devices, for example. The detected wireless devices may support the same wireless technologies and may include WiFi or Bluetooth enabled devices, such as smartphones, tablets or mobile music players, for example.

In case of WiFi, a WiFi access point may receive probe requests from wireless devices present at the location and may transmit information about the detected wireless devices to the location analytics server at regular intervals, for example. The information about a detected wireless device may comprise information, such as a Media Access Control (MAC) address of the detected wireless device and an RSSI with which the detected wireless device is seen by the wireless sensing device.

The location analytics server may be a cloud-based server and may reside in a cloud computing environment. The one or more wireless sensing devices installed at the location may establish connectivity with the location analytics server to transmit the information about the detected wireless devices to the location analytics server, such as via the Internet, for example. It will be understood, however, that the location analytics server may also be installed locally in an intranet-based location analytics system, for example. The location to be observed may be any predefined area, including indoor and/or outdoor areas, at which the one or more wireless sensing devices may be installed for observation purposes. The location may comprise a facility which may include one or more buildings or rooms, for example.

The location analytics server may be configured to analyze the information about the detected wireless devices to classify, for each of the detected wireless devices, whether the respective wireless device is a visitor device or a passerby device. For this purpose, at least one criterion to be satisfied for classifying a detected wireless device as a visitor device, i.e., as a device belonging to a visitor of the location, may be employed. If the at least one criterion is not satisfied for a detected wireless device, the detected wireless device may be classified as a passerby device, i.e., as a device belonging to a passerby.

Unlike traditional location analytics solutions, in which the classification of a detected wireless device is typically performed according to a rather simple and fixed "out-of-the-box" logic which is equal across all locations in which the system is applied, in the system presented herein, the classification of a detected wireless device may be performed based on a location-specific configuration which is specifically adapted to the location to be observed, i.e., which takes into account the particular characteristics of the location to be observed. When the system presented herein is employed in different locations, the classification of a detected wireless device as either a visitor device or a passerby device may be carried out in accordance with different criteria which are specifically adapted to the respective location. In this way, more accurate classification results may be achieved as compared to traditional systems.

In one implementation, the information about the detected wireless devices may include a signal strength observed for the respective wireless device, wherein the at least one criterion may comprise a minimum signal strength required for classifying the respective wireless device as a visitor device. Thus, a wireless device may be classified as a visitor device if, for one or more of the wireless sensing devices, the wireless device has been observed with a minimum signal strength (or higher). On the other hand, if the minimum signal strength is not reached, the wireless device may be classified as a passerby device. In case of WiFi, the signal strength may correspond to an RSSI. The minimum signal strength may initially be determined by signal strength measurements, e.g., performed at the installation time of the wireless sensing devices, at the location to be observed. For example, measurements may be performed at places representative of the location, such as at an entry door or at the outer walls of the location, i.e., places from which it may be derived that the detected wireless device is within the location to be observed.

Alternatively, or additionally, the at least one criterion may comprise a required minimum number of detections of the respective wireless device, optionally with the minimum signal strength, within a predetermined time interval. Thus, in one implementation, the at least one criterion may require that, for classifying a wireless device as a visitor device, the wireless device needs to be observed a minimum number of times (in case of WiFi, a minimum number of detected probe requests, for example) with the minimum signal strength within the predetermined time interval (expressed as a number of minutes, for example). It will be understood that, when these criteria are configured to reflect the values obtained by the measurements performed at the installation time mentioned above (thereby specifically reflecting the characteristics of the location to be observed), highly accurate classification results may be achieved as compared to the fixed "out-of-the-box" solutions of the traditional systems mentioned above. Classifications of detected wireless devices may be performed by the location analytics server each time the location analytics server receives updated information about the detected wireless devices and, therefore, information about the wireless devices present at the location, in particular the determined visitor devices, may be made available in (almost) real-time.

To improve the classification accuracy of the detected wireless devices, it has been observed that criteria like the signal strength or the number of observations (e.g., the required number of received probe requests from a wireless device) within the predetermined time interval may differ between devices of different manufacturers, or even between different device types, including different models of the same device. In one implementation, therefore, the information about the detected wireless devices may include a MAC address of the respective wireless device, wherein the MAC address may be indicative of a manufacturer and/or a device type of the respective wireless device. In the location-specific configuration, the above-mentioned criteria, i.e., at least one of the minimum signal strength, the minimum number of detections and the predetermined time interval, may be set differently for each manufacturer and/or device type. Corresponding measurements at the installation time, as described above, may then be performed with diverse device types from different manufacturers in order to determine these criteria separately for each device type and/or manufacturer.

To further improve the classification accuracy, not only one, but a plurality of wireless sensing devices with overlapping reception areas may be installed at the location. The one or more wireless sensing devices may thus comprise at least two wireless sensing devices and the at least one criterion of the location-specific configuration may require detecting a respective wireless device by at least two wireless sensing devices for classifying the respective wireless device as a visitor device. In this way, false classifications of visitors or passersby, which may occur with the use of a single wireless sensing device at the location, may be reduced. With a plurality of wireless sensing devices, it may also be possible to estimate the position of a detected wireless device within the location based on signal strengths observed for the detected wireless device by a plurality of wireless sensing devices at the same time, i.e., in accordance with a Wireless Local Area Network (WLAN) fingerprinting technique, for example.

In location analytics, a general parameter of interest may be the number of actual visitors present at the location to be observed (e.g., at a particular time or within a particular time period, such as a particular time of day, for example). In practice, not all visitors of a location to be observed may carry a wireless device detectable by the one or more wireless sensing devices and, therefore, the total amount of detected wireless devices classified as visitor devices may not necessarily reflect the real number of visitors present at the location. In an implementation concerned with this aspect, the location analytics server may further be configured to analyze the information about the detected wireless devices to estimate a number of actual visitors present at the location, wherein the location-specific configuration may comprise a factor indicative of an estimated portion of visitors at the location not carrying a wireless device, wherein the factor may be specifically adapted to the location, and wherein estimating the number of actual visitors may comprise adjusting a total number of visitor devices determined from the information about the detected wireless devices by the factor. By applying the factor, a more realistic estimation of the number of actual visitors present at the location may be achieved.

To determine the factor with particular regard to the characteristics of the location to be observed, the factor may be determined based on comparing the total number of visitor devices determined from the information about the detected wireless devices with a number of actual visitors present at the location obtained by actual counts. The actual counts may be obtained by a technical measuring system which may optionally comprise at least one of a camera, a light barrier, a turnstile, and a floor mat having a pressure sensor (or other entry systems), for example. Such measuring systems may be used to count the number of persons entering and exiting the location and, thereby, to determine the actual number of visitors present at the location over time. The actual number thus determined may be correlated with the total number of visitor devices determined from the information about the detected wireless devices (e.g., via corresponding timestamps) to determine the factor, e.g., as a relation representative of a portion of additional visitors that do not carry a wireless device. As a mere example, if the total number of visitor devices determined from the information about the detected wireless devices at a particular point in time is 10 and the counted number of actual visitors is 15, the factor may be determined to be 1.5. Other than determining the actual counts by a technical measuring system, it will be understood that counts may also be obtained by empirical collections that may include on-site observations with manual counts of the persons entering and exiting the location, for example. Also, it may be conceivable that the factor may have different values depending on the time of day in order to reflect different visitor frequencies at the location typical for different times of the day, for example.

If actual counts of the number of visitors present at the location are not available, e.g., in case of locations at which no technical measuring systems for performing actual counts are available, a factor which has previously been determined for another location may be used as reference. More specifically, the factor used for calculating the number of actual visitors present at one location may correspond to a factor determined for another location, wherein the other location may be of the same type, in the same geographical region (e.g., in the same city) and/or in the same type of geographical region (e.g., rural or urban). Here, it is assumed that, for the same type of location or the same geographical region (or type thereof), the visitors at both locations may have similar demographic characteristics and that, therefore, the estimated portions of visitors not carrying a wireless device may be similar. Exemplary location types may include location types, such as, fitness studios, retail stores, restaurants, malls, amusement parks, etc., for example. In addition to using a factor of another location, the transferred factor may be adjusted based on demographic information associated with the other location, such as average income, age, origin of population, or the like. If, for example, a factor initially determined for a fitness studio in city A is transferred and used as factor for a fitness studio in city B, and city B has a population with a higher average age than city A, the factor may be increased because the estimated portion of visitors not carrying a wireless device can be assumed to be generally higher in city B. By transferring a factor determined for one location and using it for another location, estimations of the number of actual visitors present at the other location may still be accurate, even though a factor has not specifically been determined for the other location based on actual on-site counts, for example.

In further implementations, it may be conceivable to use the information regarding the determined visitor devices and the estimated number of actual visitors present at the location (in the following simply "information regarding the visitor devices and visitors") calculated by the location analytics server for technical use cases, such as for an automatic control of technical devices associated with the location to be observed. In this case, the system presented herein may, further than a mere location analytics system, act as a location automation system in which the environment of the location may be controlled based on the information calculated by the location analytics server. In such a case, the system may further comprise at least one controllable device associated with the location, wherein the at least one controllable device may be controlled based on the estimated number of actual visitors determined by the location analytics server, for example. Also, the location analytics server may be configured to estimate a position of each detected wireless device classified as visitor device within the location and the at least one controllable device may (alternatively or additionally to the control based on the estimated number of actual visitors) be controlled based on the estimated positions of the visitor devices. In some variants, the location analytics server may be configured to control the at least one controllable device itself and, in other variants, the location analytics server may be configured to provide the calculated information regarding the visitor devices and visitors to a controller for control of the at least one controllable device. The location analytics server may in this sense be part of an Internet of Things (IoT) environment and may provide the calculated information regarding the visitor devices and visitors via corresponding interfaces to controllers available in the IoT environment.

In one such implementation, the system may be a facility automation system, wherein the at least one controllable device may comprise a controllable facility component. As mentioned above, a facility may comprise one or more buildings or rooms and, therefore, the at least one controllable device may comprise a controllable component of a building automation system, for example. As a mere example, the controllable facility component may comprise at least one of an air conditioning system, a lighting system, a sound system, a guidance system, an automated locking system, and an automated service system associated with the facility.

As explained above, the location analytics server may calculate the information regarding the visitor devices and visitors in real-time and, therefore, the facility component (or more generally, the at least one controllable device) may be controlled in real-time based on actual changes in the visitor distribution at the location, e.g., based on an increasing or decreasing total number of visitors at the location, or based on an increasing or decreasing number of visitors at a particular place within the location. In case of an air conditioning system, for example, the air conditioning system may be controlled to adjust or maintain the temperature and/or humidity at the location depending on the number of visitors currently present at the location. If, for example, on a hot summer day, a retail store is cooled down to a certain temperature level and, at once, a large number of new customers enters the retail store (e.g., a travel group getting off a coach), the location analytics server may instantly recognize the increased number of customers at the retail store and the air conditioning system may immediately be controlled to increase its cooling operation to thereby maintain the temperature level at the retail store.

Similar use cases are conceivable with other facility components. In case of a lighting system, for example, the lighting system may be controlled to increase or decrease the light intensity depending on the number of visitors currently present at the location or at a particular place within the location. In case of a sound system, the sound system may be controlled to increase or decrease the volume of music currently played at the location or at a particular place within the location. Also, the sound system may be controlled to switch the type of music played depending on the information on the visitors (e.g., soft music may be selected in case of high visitor frequency). In case of an electronic guidance system, the guidance system may be controlled to guide visitors depending on the occupancy rate of the location or parts thereof, e.g., to avoid congestions at a particular place within the location. In an amusement park, for example, the location analytics system may have information on the occupation rate of restrooms, shops, parking areas, or the like, and the guidance system may be controlled to avoid congestions at these places accordingly. In this connection, automated locking systems associated with entry systems of the facility (e.g., turnstiles, revolving doors, gates, etc.) may be controlled accordingly. Depending on the occupancy rate of the location or parts thereof, it may also be conceivable to control an automated service system to provide a service at the location or at a particular place thereof. For example, an automated lawn mower or vacuum cleaner robot may be controlled to operate at a particular place within the location if no person is currently present at that place. In a fast food restaurant, on the other hand, automated kitchen appliances may be controlled to prepare different kinds of meals depending on the visitor frequency. For example, in case of low visitor frequency, a larger portion of meals having a longer preparation time may be prepared, whereas, in case of high visitor frequency, a larger portion of meals having a short preparation time may be prepared.

It will be understood that various other use case scenarios are generally conceivable. Further, it will be understood that the applicability of such use cases generally arises from the fact that the location analytics techniques presented herein are capable of providing information about the visitors present at the location in real-time and with high accuracy. With traditional location analytics solutions which produce less timely and reliable analytics results, many of such use case scenarios would not be feasible.

According a second aspect, a method performed by a location analytics server is provided. The method comprises receiving, from each of one or more wireless sensing devices installed at a location to be observed, information about detected wireless devices, and analyzing the information about the detected wireless devices to classify, for each of the detected wireless devices, whether the respective wireless device is a visitor device or a passerby device, wherein classifying the respective wireless device is performed based on a location-specific configuration comprising at least one criterion to be satisfied for classifying the respective wireless device as a visitor device, wherein the at least one criterion is specifically adapted to the location.

The method according to the second aspect may correspond to the method steps performed by the location analytics server of the system described above according to the first aspect. Thus, the features described herein with reference to the location analytics server of the first aspect may also be embodied in the steps of the method of the second aspect. Unnecessary repetitions are thus omitted in the following.

According to a third aspect, a location analytics server configured to perform the method of the second aspect is provided. The location analytics server may comprise at least one processor and at least one memory, wherein the at least one memory contains instructions executable by the at least one processor such that the location analytics server is operable to carry out the corresponding method steps. It will further be understood that the location analytics server may be a physical computing unit as well as a virtualized computing unit, such as a virtual machine, for example. Also, it will be appreciated that the location analytics server may not necessarily be implemented as a standalone computing unit, but may be implemented as components—realized in software and/or hardware—residing on multiple distributed computing unit as well.

According to a fourth aspect, a computer program product is provided. The computer program product comprises program code portions for performing the method of the second aspect when the computer program product is executed on one or more computing devices (e.g., a processor or a distributed set of processors). The computer program product may be stored on a computer readable recording medium, such as a semiconductor memory, DVD, CD-ROM, and so on.

In the following, the present disclosure will further be described with reference to exemplary implementations illustrated in the figures, in which:

FIG. 2 illustrates an exemplary data collection for determining a factor indicative of a portion of visitors not carrying a wireless device; and FIGS. 3a to 3c illustrate exemplary compositions of a location analytics server and a method embodiment which may be performed by the location analytics server according to the present disclosure.

In the following description, for purposes of explanation and not limitation, specific details are set forth in order to provide a thorough understanding of the present disclosure. It will be apparent to one skilled in the art that the present disclosure may be practiced in other implementations that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
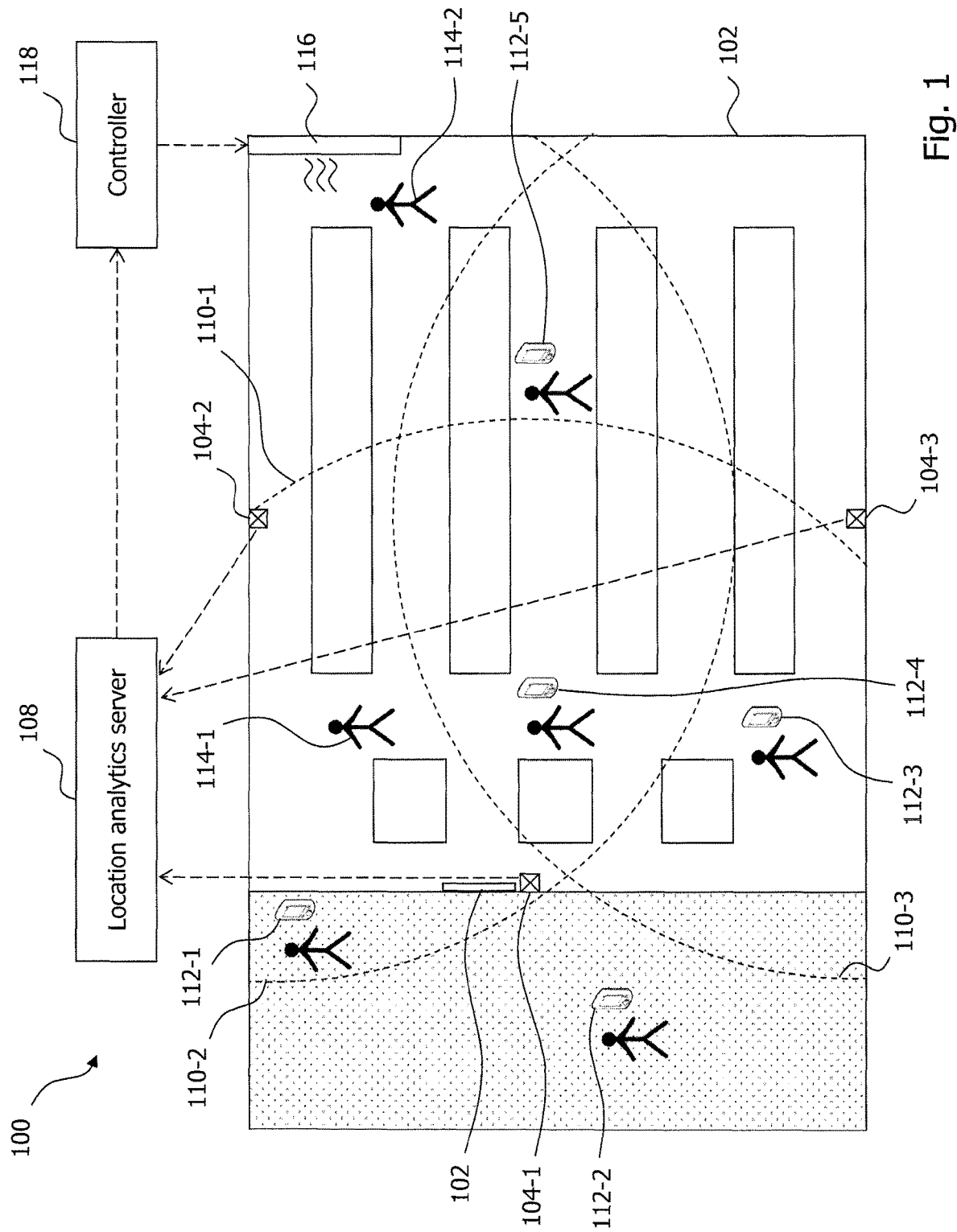
FIG. 1 illustrates a schematic overview of an exemplary location analytics and automation system according to the present disclosure.

FIG. 1 illustrates a schematic overview of an exemplary location analytics and automation system 100 for a location 102 which, in the presented example, may correspond to a retail store. In the retail store 102, three wireless sensing devices 104 are installed for the purpose of observing the environment for the presence of customers (or more generally, visitors of the retail store 102). Each of the wireless sensing devices 104 is given by a WiFi access point which senses the environment for the presence of wireless devices by considering probe requests received from wireless devices in its reception area. More specifically, a first WiFi access point 104-1 is installed next to an entry door 106 of the retail store 102, a second WiFi access point 104-2 is installed at a first outer wall of the retail store 102 and a third WiFi access point 104-3 is installed at a second outer wall of the retail store 102. Each of the WiFi access points 104 is configured to transmit information about detected wireless devices to a location analytics server 108 (indicated by dashed-line arrows from the wireless sensing devices 104 to the location analytics server 108) which may be a cloud-based server residing in a cloud computing environment. Transmission of the information about the wireless detected devices may be carried out over the Internet, for example.

Each of the WiFi access points 104 may be configured to transmit the collected information about the detected wireless devices to the location analytics server 108 at regular intervals, such as every minute, for example, and the information about the detected wireless devices may comprise a MAC address of each wireless device and an RSSI with which the wireless device is observed. As an example, the WiFi access points 104 may correspond to "Meraki" access points as provided by Cisco Systems which provide an Application Programming Interface (API) through which information about detected wireless devices can be transmitted using the following data format:

```
{
  "apMac": <string>,
```

-continued

```
"apTags": [<string>, ...],
"apFloors": [<string>, ...],
"observations": [
    {
        "clientMac": <string>,
        "ipv4": <string>,
        "ipv6": <string>,
        "seenTime": <string>,
        "seenEpoch": <integer>,
        "ssid": <string>,
        "rssi": <integer>,
        "manufacturer": <string>,
        "os": <string>,
        "location": {
            "lat": <decimal>,
            "lng": <decimal>,
            "unc": <decimal>,
            "x": [<decimal>, ...],
            "y": [<decimal>, ...]
        },
    },...
]
}
```

Here, "apMac" defines the address of the observing access point, "clientMac" the MAC address of the observed wireless device, "ipv4" or "ipv6" the IP address of the wireless device, "seenTime" the observation time of the wireless device, and "rssi" the RSSI of the wireless device as seen by the access point.

In FIG. 1, exemplary reception areas of the WiFi access points 104-1, 104-2 and 104-3 are indicated by reference numerals 110-1, 110-2 and 110-3 and, as may be seen in the figure, WiFi access point 104-1 may detect wireless user devices 112-1, 112-2, 112-3 and 112-4, WiFi access point 104-2 may detect wireless user devices 112-1, 112-4 and 112-5, and WiFi access point 104-3 may detect wireless user devices 112-3, 112-4 and 112-5. The wireless devices may be WiFi enabled devices carried by corresponding users, such as smartphones, tablets or mobile music players, for example.

Once the location analytics server 108 receives the information about the detected wireless devices 112, the location analytics server 108 may analyze this information to classify, for each of the detected wireless devices 112, whether the respective wireless device 112 is a visitor device or a passerby device. For this purpose, at least one criterion to be satisfied for classifying a detected wireless device as a visitor device may be employed, wherein the classification is made based on a location-specific configuration which is specifically adapted to the retail store 102.

For example, for a single WiFi access point 104, the at least one criterion may comprise a minimum signal strength required for classifying the respective wireless device as a visitor device as well as a required minimum number of observations within a predetermined time interval, so that only those among the detected wireless devices 112 will be classified as visitor devices which are observed a minimum number of times with the minimum signal strength within the predetermined time interval. Detected wireless devices 112 which do not satisfy these criteria, on the other hand, will be classified as passerby devices. With appropriately defined values for these criteria, WiFi access point 104-1 will classify wireless devices 112-3 and 112-4 as visitor devices and wireless devices 112-1 and 112-2 as passerby devices (as can be seen in the figure, users of devices 112-1 and 112-2 are outside of the retail store 102 and thus considered as passersby), WiFi access point 104-2 will classify wireless devices 112-4 and 112-5 as visitor devices and wireless device 112-1 as passerby device, and WiFi access point 104-3 will classify each of wireless devices 112-3, 112-4 and 112-5 as visitor devices. Since WiFi access points 104-1, 104-2 and 104-3 have overlapping reception areas, in order to improve the classification accuracy, an additional criterion requiring that a wireless device 112 must be detected by at least two of the WiFi access points 104 may be defined for classifying a detected wireless device 112 as a visitor device. In the presented example, this will lead to the same classification results.

The criteria mentioned above may be defined at the installation time of the WiFi access points 104 at the retail store 102, taking into consideration the particular on-site characteristics of the retail store 102 and its environment. In particular, for the criteria of the minimum signal strength, the minimum number of observations and the predetermined time interval, measurements may be performed at places representative of the location, i.e., exemplary places within the retail store 102 as well as outside (e.g., in front of) the retail store 102. These measurements may be made with diverse device types including different models and manufacturers in order to determine these criteria separately for each device type and/or manufacturer. Since the information about the device type and/or the manufacturer of a wireless device 112 may later be determined from the MAC address of the wireless device 112, this information may be used to additionally improve the classification accuracy.

In location analytics, a general parameter of interest is the number of actual visitors present at a location to be observed. As may be seen in FIG. 1, wireless user devices 112-3, 112-4 and 112-5 do not reflect the actual number of visitors present in the retail store 102 because two further visitors 114-1 and 114-2, who do not carry a wireless device, are present in the retail store 102. Thus, to achieve a more realistic estimation of the actual visitors present at the retail store, a factor may be applied to the determined total number of detected visitor devices. The factor may be indicative of an estimated portion of visitors at the retail store not carrying a wireless device and may be part of the location-specific configuration for the retail store 102. The factor may be specifically adapted to visitor characteristics generally observed at the retail store 102. In the presented example, where the number of detected visitor devices is three, a factor of 1.6 would lead to the correct number of actual visitors present at the location, i.e., five.

The factor may have previously been determined based on comparing the total number of visitor devices determined from the information about the detected wireless device with a number of actual visitors present at the retail store 102 obtained by actual counts. The actual counts may be obtained by a technical measuring system (not shown) which may comprise a camera, a light barrier, a turnstile and/or a floor mat having a pressure sensor, for example. Using such measuring systems, the number of persons entering and exiting the retail store 102 may be counted to determine the actual number of visitors present at the retail store 102 over time. To determine the factor, the actual number thus determined may then be correlated with the total number of detected visitor devices. An example of such calculation will later be described with reference to FIG. 2.

The estimated number of actual visitors present at the retail store 102 determined by the location analytics server 108 may further be used for an automatic control of an air conditioning system 116 of the retail store 102. The system 100 thus not only operates as a location analytics system but also as a facility automation system in which the environment of the facility is controlled based on the information calculated by the location analytics server 108. As illustrated in FIG. 1, the location analytics server 108 may provide the calculated information regarding the number of actual visitors currently present at the retail store 102 to a controller 118 for control of the air conditioning system 116. The controller 118 may be a Programmable Logic Controller (PLC) capable of controlling the air conditioning system 116, for example. Since the location analytics server 108 may calculate the number of actual visitors present at the retail store 102 in real-time, the air conditioning system 116 may be controlled in real-time as well, i.e., based on actual changes of the number of visitors present at the location. The air conditioning system may be controlled to maintain the temperature at the location depending on the number of visitors currently present, for example. If, for example, the retail store 102 is cooled down to a certain temperature level and a large number of new customers enters the retail store 102 (e.g., a travel group getting off a coach), the location analytics server 108 may instantly recognize the increased number of customers, notify the controller 118 and the controller 118 may immediately control the air conditioning system 116 to increase its cooling operation to thereby maintain the temperature level at the retail store 102.

Turning now to FIG. 2, an exemplary data collection for determining the above-mentioned factor for the retail store 102 is illustrated. As may be seen in the left two columns of the figure, the number of visitor devices detected by the location analytics server 108 is listed over time with corresponding timestamps. In the right two columns, actual counts of the number of visitors present at the retail store 102 are indicated over time, again with corresponding timestamps. As mentioned above, the actual counts may have been obtained by a technical measurement system, such as a camera, a light barrier, a turnstile or a floor mat having a pressure sensor, for example. Also, it is conceivable that the counts are obtained by empirical collections that include on-site observations with manual counts of persons entering and exiting the retail store 102. To determine the factor, the number of actual visitors indicated in the right two columns may be correlated (e.g., via corresponding timestamps) with the number of detected visitor devices indicated in the left two columns. As will be appreciated, the factor may then be calculated as a value reflecting a relation between the number of the detected visitor devices and the number of actual visitors, e.g., over a certain period of time. For example, the calculation may include determining an average for each of the counts and, based thereon, determining the relationship between the two averages. In the example shown, between 12:01:00 and 12:10:00, the average number of detected visitor devices is 3.2 and the average number of actual visitors is 5.1 and, therefore, the factor may be 1.59 for this period. It will be understood, however, that this calculation is merely exemplary and that other algorithms for determining a factor reflecting a relation between the number of the detected visitor devices and the number of actual visitors are generally conceivable.

The factor thus determined (e.g., possibly for different times of a day) may then not only be used for the retail store 102 itself, but may also be used as a reference for other locations of the same type, in the same geographical region and/or in the same type of geographical region. This may be the case when actual counts of the number of visitors present at the other location are not available, e.g., in case of a location at which no technical measuring system for performing actual counts is available. The factor determined for the retail store 102 may thus be used as factor for a retail store of the same type in another city, for example. In this case, for the retail store in the other city, the factor may optionally be adjusted based on demographic information associated with the other city, such as average income, age, origin of population, or the like. If the city of the other retail store has a population with a higher average age, for example, the factor may be increased as the estimated portion of visitors not carrying a wireless device can be assumed to be generally higher in the other city.

It will be understood that the above implementations according to FIGS. 1 and 2 are merely exemplarily and that the techniques described herein may be practiced in various other forms. For example, it will be understood that the technique described herein may be employed at other location types and not only at a retail store, e.g., at facilities with one or more buildings and/or outside areas, such as amusement parks, malls, restaurants, fitness studios, etc. Also, it will be understood that it is generally conceivable to implement the detection of the wireless devices using wireless technologies other than WiFi (e.g., Bluetooth) and that a device being controlled based on the information calculated by the location analytics server may generally comprise any conceivable device associated with the observed location. Further, rather than transmitting the information about the detected wireless devices from the wireless sensing devices at regular intervals (such as e.g. every minute), the wireless sensing devices may be configured to transmit the information about a detected wireless device immediately (e.g., immediately upon receipt of a probe request). In this way, the information available to the location analytics server may always be up-to-date and a true real-time solution may thus be achieved.

Figure 3A:
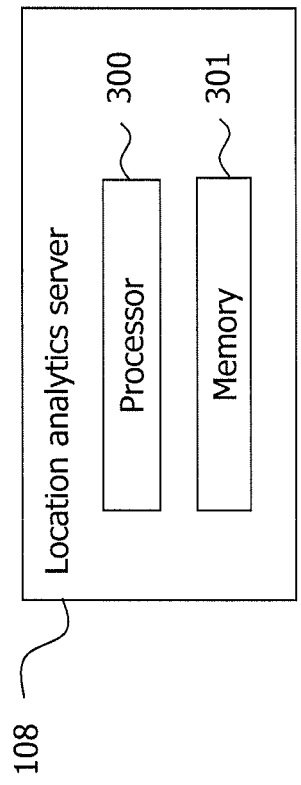

FIG. 3a illustrates an exemplary composition of the location analytics server 108. The location analytics server 108 may comprise at least one processor 300 and at least one memory 301, wherein the at least one memory 301 may contain instructions executable by the at least one processor 300 such that the location analytics server is operable to carry out the method steps described herein.

Figure 3B:
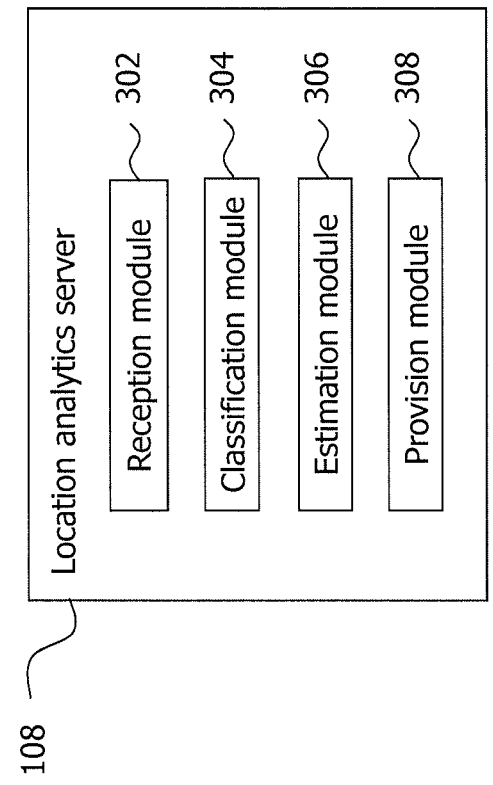

FIG. 3b illustrates an exemplary modular composition of the location analytics server 108 and FIG. 3c illustrates a corresponding method embodiment which may be performed by the location analytics server 108. The basic operation of the location analytics server 108 will be described in the following with reference to both FIGS. 3b and 3c.

In step S302, a reception module 302 of the location analytics server 108 may receive, from each of one or more wireless sensing devices installed at a location to be observed, information about detected wireless devices. In step S304, a classification module 304 of the location analytics server 108 may analyze the information about the detected wireless devices to classify, for each of the detected wireless devices, whether the respective wireless device is a visitor device or a passerby device, wherein classifying the respective wireless device is performed based on a location-specific configuration comprising at least one criterion to be satisfied for classifying the respective wireless device as a visitor device, wherein the at least one criterion is specifically adapted to the location.

Further, in step S306, an estimation module 306 of the location analytics server 108 may analyze the information about the detected wireless devices to estimate a number of actual visitors present at the location, wherein the location-specific configuration comprises a factor indicative of an estimated portion of visitors at the location not carrying a wireless device, wherein the factor is specifically adapted to the location, and wherein estimating the number of actual visitors comprises adjusting a total number of visitor devices determined from the information about the detected wireless devices by the factor. In step S308, a provision module 308 of the location analytics server 108 may provide the estimated number of actual visitors to a controller for control of at least one controllable device associated with the location.

As has become apparent from the above, the present disclosure provides location analytics techniques which, unlike traditional location analytics solutions, employ location-specific configurations for classifying detected wireless devices as visitor or passerby devices and achieve considerably better classification results than the rather simple and fixed "out-of-the-box" solutions of traditional systems. The possibility of providing real-time information about the visitors present at a location with high accuracy generally opens up the opportunity for technical use cases in the field of automation systems which would typically not be feasible with traditional solutions due to the lacking accuracy of the calculated data. In particular, in case of facility automation systems, for example, facility components, such as air conditioning, lighting or sound systems, can be controlled in real-time based on actual changes of the visitor distribution at the facility.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

The invention claimed is:

1. A system comprising:
   a location analytics server; and
   one or more wireless sensing devices installed at a location to be observed, each of the one or more wireless sensing devices being configured to transmit information about detected wireless devices to the location analytics server,
   wherein the location analytics server is configured to analyze the information about the detected wireless devices to classify, for each of the detected wireless devices, whether the respective wireless device is a visitor device or a passerby device, wherein classifying the respective wireless device is performed based on a location-specific configuration comprising at least one criterion to be satisfied for classifying the respective wireless device as a visitor device, wherein the at least one criterion is specifically adapted to the location,
   wherein the information about the detected wireless devices includes a signal strength observed for the respective wireless device, and wherein the at least one criterion comprises a minimum signal strength required for classifying the respective wireless device as a visitor device,
   wherein the at least one criterion comprises a required minimum plurality of detections of the respective wireless device with the minimum signal strength within a predetermined time interval,
   wherein the information about the detected wireless devices includes a Media Access Control, MAC, address of the respective wireless device, the MAC address being indicative of a manufacturer and/or a device type of the respective wireless device, and
   wherein the minimum plurality of detections is set differently per manufacturer and/or device type of the respective wireless device.

2. The system of claim 1, wherein the one or more wireless sensing devices comprise at least two wireless sensing devices, and wherein the at least one criterion requires detecting the respective wireless device by at least two wireless sensing devices for classifying the respective wireless device as a visitor device.

3. The system of claim 1, wherein the location analytics server is further configured to analyze the information about the detected wireless devices to estimate a number of actual visitors present at the location, wherein the location-specific configuration comprises a factor indicative of an estimated portion of visitors at the location not carrying a wireless device, wherein the factor is specifically adapted to the location, and wherein estimating the number of actual visitors comprises adjusting a total number of visitor devices determined from the information about the detected wireless devices by the factor.

4. The system of claim 3, wherein the factor is determined based on comparing the total number of visitor devices determined from the information about the detected wireless devices with a number of actual visitors present at the location obtained by actual counts.

5. The system of claim 4, wherein the actual counts are obtained by a measuring system, optionally comprising at least one of a camera, a light barrier, a turnstile and a floor mat having a pressure sensor, or by empirical collections.

6. The system of claim 3, wherein the factor corresponds to a factor determined for another location, wherein the other location may be of the same type, in the same geographical region and/or in the same type of geographical region.

7. The system of claim 6, wherein the factor is adjusted based on demographic information associated with the other location.

8. The system of claim 3, further comprising at least one controllable device associated with the location, wherein the at least one controllable device is controlled based on the estimated number of actual visitors determined by the location analytics server.

9. The system of claim 8, wherein the location analytics server is configured to estimate a position of each detected wireless device classified as visitor device within the location, and wherein the at least one controllable device is controlled based on the estimated positions of the visitor devices.

10. The system of claim 8, wherein the system is a facility automation system, and wherein the at least one controllable device comprises a controllable facility component.

11. The system of claim 10, wherein controllable facility component comprises at least one of:
   an air conditioning system;
   a lighting system;
   a sound system;
   a guidance system;
   an automated locking system; and
   an automated service system.

12. A method performed by a location analytics server, the method comprising:
   receiving, from each of one or more wireless sensing devices installed at a location to be observed, information about detected wireless devices; and
   analyzing the information about the detected wireless devices to classify, for each of the detected wireless devices, whether the respective wireless device is a visitor device or a passerby device, wherein classifying the respective wireless device is performed based on a location-specific configuration comprising at least one criterion to be satisfied for classifying the respective wireless device as a visitor device, wherein the at least one criterion is specifically adapted to the location, wherein the information about the detected wireless devices includes a signal strength observed for the respective wireless device, and wherein the at least one criterion comprises a minimum signal strength required for classifying the respective wireless device as a visitor device, wherein the at least one criterion comprises a required minimum plurality of detections of the respective wireless device with the minimum signal strength within a predetermined time interval, wherein the information about the detected wireless devices includes a Media Access Control, MAC, address of the respective wireless device, the MAC address being indicative of a manufacturer and/or a device type of the respective wireless device, and wherein the minimum plurality of detections is set differently per manufacturer and/or device type of the respective wireless device.

13. A location analytics server configured to perform the method of claim 12.

14. A non-transitory computer readable recording medium storing a computer-executable program, the program comprising:

receiving instructions configured to cause receiving, from each of one or more wireless sensing devices installed at a location to be observed, of information about detected wireless devices; and analyzing instructions configured to cause analyzing of the information about the detected wireless devices to classify, for each of the detected wireless devices, whether the respective wireless device is a visitor device or a passerby device, wherein classifying the respective wireless device is performed based on a location-specific configuration comprising at least one criterion to be satisfied for classifying the respective wireless device as a visitor device, wherein the at least one criterion is specifically adapted to the location, wherein the information about the detected wireless devices includes a signal strength observed for the respective wireless device, and wherein the at least one criterion comprises a minimum signal strength required for classifying the respective wireless device as a visitor device, wherein the at least one criterion comprises a required minimum plurality of detections of the respective wireless device with the minimum signal strength within a predetermined time interval, wherein the information about the detected wireless devices includes a Media Access Control, MAC, address of the respective wireless device, the MAC address being indicative of a manufacturer and/or a device type of the respective wireless device, and wherein the minimum plurality of detections is set differently per manufacturer and/or device type of the respective wireless device.

* * * * *